United States Patent
Liu

(10) Patent No.: US 9,686,498 B2
(45) Date of Patent: Jun. 20, 2017

(54) CURVATURE ADJUSTABLE DISPLAY DEVICE

(71) Applicant: Shenzhen China Star Optoelectronics Technology Co., Ltd., Shenzhen, Guangdong (CN)

(72) Inventor: Yawei Liu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 340 days.

(21) Appl. No.: 14/423,428

(22) PCT Filed: Feb. 8, 2015

(86) PCT No.: PCT/CN2015/072472
§ 371 (c)(1),
(2) Date: Feb. 23, 2015

(87) PCT Pub. No.: WO2016/082337
PCT Pub. Date: Jun. 2, 2016

(65) Prior Publication Data
US 2016/0156871 A1 Jun. 2, 2016

(30) Foreign Application Priority Data
Nov. 28, 2014 (CN) .......................... 2014 1 0710436

(51) Int. Cl.
*H04N 5/655* (2006.01)
*G06F 1/16* (2006.01)
*G02F 1/1333* (2006.01)

(52) U.S. Cl.
CPC ........... *H04N 5/655* (2013.01); *G06F 1/1601* (2013.01); *G06F 1/1652* (2013.01); *G02F 1/133305* (2013.01); *G06F 2200/1612* (2013.01)

(58) Field of Classification Search
CPC .......................... G02F 1/133305; H04N 5/655
(Continued)

(56) References Cited

U.S. PATENT DOCUMENTS 9,123,290 B1 * 9/2015 Cho ...................... G06F 1/1652
2012/0067134 A1 * 3/2012 Bell .................. G02F 1/133305
73/800

(Continued)

FOREIGN PATENT DOCUMENTS

KR    EP 2790240 A1 * 10/2014 ............... H05K 5/03

*Primary Examiner* — Jay Patel
*Assistant Examiner* — Marnie Matt
(74) *Attorney, Agent, or Firm* — Andrew C. Cheng

(57) ABSTRACT

A curvature adjustable display device includes a base, a display panel arranged on the base, a rear cover arranged rearwards of the display panel and having a bottom extending into an interior of the base, connection sections arranged in the interior of the base and respectively connected to two opposite side edges of the rear cover, an adjustment mechanism arranged in a front portion of the base, and two chains arranged in the interior of the base and each having two ends respectively connected to the connection sections and the adjustment mechanism. Rotation of the adjustment mechanism stretches the chains and drives, via the connection sections, the rear cover to curve, and simultaneously, the rear cover drives the display panel to curve so as to achieve adjustment of curvature of the display panel.

16 Claims, 3 Drawing Sheets

(58) Field of Classification Search
USPC .................................................. 348/836–843
See application file for complete search history.

(56) References Cited

U.S. PATENT DOCUMENTS

| | | | |
|---|---|---|---|
| 2013/0155655 A1* | 6/2013 | Lee .......................... | H05K 5/03 362/97.1 |
| 2014/0118910 A1* | 5/2014 | Sung ....................... | G09F 9/301 361/679.01 |
| 2014/0179191 A1* | 6/2014 | Ko ......................... | G02F 1/1303 445/24 |
| 2014/0226266 A1* | 8/2014 | Kang .................. | H01L 51/0097 361/679.01 |
| 2014/0354519 A1* | 12/2014 | Lee ......................... | G09F 9/301 345/76 |
| 2015/0185761 A1* | 7/2015 | Song .................... | G06F 1/1601 361/679.21 |

* cited by examiner

CURVATURE ADJUSTABLE DISPLAY DEVICE

BACKGROUND OF THE INVENTION

1. Field of the Invention

The present invention relates to the field of displaying technology, and in particular to a curvature adjustable display device.

2. The Related Arts

The progress of optoelectronics and semiconductor technology brings vivid and prosperous development of the displaying technology. In the field of the displaying technology, flat panel display devices, such as liquid crystal displays (LCDs) and organic light emitting diodes (OLEDs), have been gradually taking the place of cathode ray tube (CRD) displays and are the two major categories that are being developed relatively fast among the contemporary display devices.

LCDs have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

OLED displays have various advantages, such as nature light, low driving voltage, high light emission efficiency, short response time, high clarity and contrast, virtually 180° view angle, wide operation temperature range, being capable of flexible displaying, and large area full color displaying, and are considered one that have the best development potential in the industry.

Recently, major manufacturers have marketed curved display devices. Generally speaking, the curved display devices allow for the best viewing effect from center to edge, while a regular display device has poor capability of displaying at edges of a screen. The curved display devices have a screen that is entirely of a curved design to provide a wide full-view image, allowing for the same visual enjoyment at both the central portion and the circumferential portion of the screen and also reducing distortion of off-axis viewing for viewing at a short distance. Further, the curved display devices allow a viewer's viewing distance to be extended, achieving better experience of viewing. Thus, compared to the regular display devices, the curved display devices have great advantages, including: (1) product differentiating, (2) wider viewable angle, and (3) reducing distortion for short distance viewing.

However, with the increasing demand for diversification of display devices, researches of three-dimensional (3D) images have been in progress in various fields. Commercialization of 3D image technology similarly needs curved display devices that are fit for diversification and help improve user's experiences.

Heretofore, virtually all the curved display devices are curvature-fixed curved display devices, which are set at fixed curvatures when manufactured. Users are not allowed to adjust the curvatures of the curved display devices according to actual needs. Thus, it is desired to provide a curvature adjustable display device to suit the need of the market.

SUMMARY OF THE INVENTION

An object of the present invention is to provide a curvature adjustable display device, which allows users to adjust the curvature of a display panel according to actual needs for viewing in order to improve the users' experiences and heighten the attraction of products to the market.

To achieve the above object, the present invention provides a curvature adjustable display device, which comprises a base, a display panel arranged on the base, a rear cover arranged rearwards of the display panel and having a bottom extending into an interior of the base, connection sections arranged in the interior of the base and respectively connected to two opposite side edges of the rear cover, an adjustment mechanism arranged in a front portion of the base, and two chains arranged in the interior of the base and each having two ends respectively connected to the connection sections and the adjustment mechanism;

rotation of the adjustment mechanism stretches the chains and drives, via the connection sections, the rear cover to curve and simultaneously, the rear cover drives the display panel to curve so as to achieve adjustment of curvature of the display panel.

A central portion of a bottom of the display panel is fixed by a first fixing section to the base and a central portion of the rear cover is fixed by a second fixing section to the base; and rotation of the adjustment mechanism stretches the chains and drives, via the connection sections, two side edges of the rear cover to move frontwards with respect to the second fixing section and thus getting curved and simultaneously, the rear cover drives two side edges of the display panel to move frontwards with respect to the first fixing section and thus getting curved so as to achieve adjustment of curvature of the display panel.

The rear cover has a height greater than a height of the display panel and has an excessive portion of the height extending into the interior of the base.

The chains each comprises a plurality of holes uniformly formed therein.

The adjustment mechanism comprises a rotary knob mounted on an external surface of the base, a toothed wheel enclosure mounted in the interior of the base, a toothed wheel arranged inside the toothed wheel enclosure, a rotation axle coupling the rotary knob and the toothed wheel, and locking sections arranged on two sides of the toothed wheel enclosure; and the toothed wheel are in mating engagement with the two chains and rotation of the rotary knob drives the toothed wheel to rotate so that the toothed wheel stretches the two chains to conduct adjustment of curvature of the display panel and the locking sections are operable to selectively fix the toothed wheel to prevent restoration of the curvature of the display panel.

The toothed wheel has a circumferential surface on which a plurality of uniformly distributed teeth is formed in such a way that a spacing distance of the teeth is identical to a spacing distance of the plurality of holes of the chains.

The toothed wheel enclosure comprises four opening sections that extend outwardly from an outer peripheral surface thereof in a mutually parallel manner and are in communication with an interior space of the toothed wheel enclosure; and the two chains are each received through the toothed wheel enclosure by extending through two opposite ones of the opening sections, the plurality of teeth of the toothed wheel and the plurality of holes of the two chains being engageable with each other in the interior of the toothed wheel enclosure.

The locking sections each comprises a support section fixed to the base and a locking element arranged on the support section and the support section comprises a slide channel formed in a middle thereof and the locking element is slidable within the slide channel; and the toothed wheel enclosure has an outer peripheral surface in which two through holes that are opposite to each other are formed; and the locking elements are extendable through the through holes to enter the interior of the toothed wheel enclosure to engage inter-tooth gaps of the toothed wheel and thus fixing the toothed wheel.

The chains each has an end forming an end section, the end section having a cross-sectional width that is greater than an inside diameter of the opening sections.

The base has an upper surface in which a first deviation channel and second deviation channels respectively located on two sides of the rotary knob are formed; the rear cover is received through the first deviation channel into the interior of the base and the locking elements respectively extend through the second deviation channels to the outside of the base.

The efficacy of the present invention is that the present invention provides a curvature adjustable display device, which comprises a rear cover arranged rearwards of a display panel and an adjustment mechanism mounted on a base with two chains that are connected to two sides of the rear cover being respectively in mating engagement with a toothed wheel of the adjustment mechanism, so that through rotation of the rotary knob of the adjustment mechanism to stretch the chains, the rear cover is driven to curve and the display panel is also caused to curve. Locking sections are included in the adjustment mechanism to selectively fix the curvature of the display panel that has been curved and to prevent the curvature of the display panel from springing back. The structure is simple and the operation is easy, allowing a user to adjust the display panel to a desired curvature according to the needs for viewing so as to improve the user's experience and enhance the attraction of products to the market.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
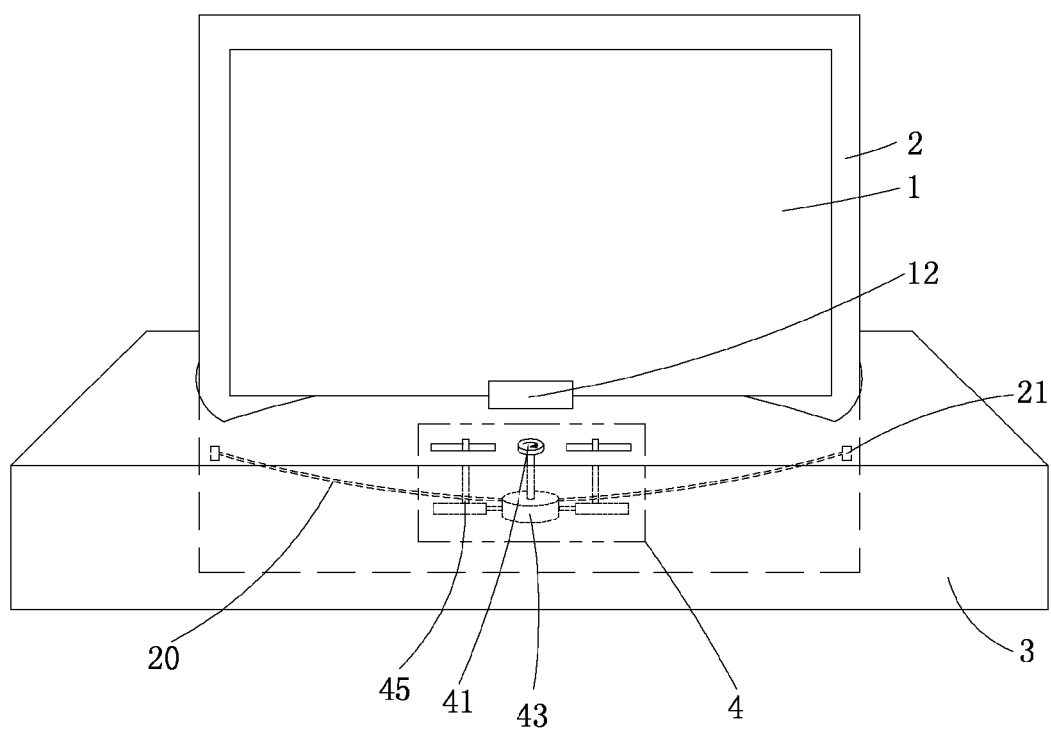
FIG. 1 is a perspective view showing a curvature adjustable display device according to the present invention.
Figure 2:
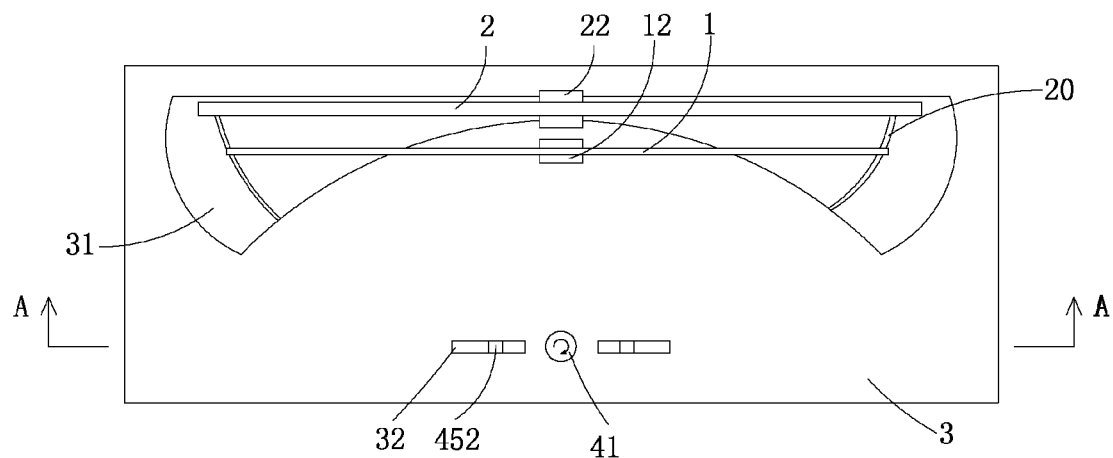
FIG. 2 is a top plan view of the curvature adjustable display device according to the present invention.

Referring collectively to FIGS. 1 and 2, the present invention provides a curvature adjustable display device, which comprises a base 3, a display panel 1 arranged on the base 3, a rear cover 2 arranged rearwards of the display panel 1 and having a bottom extending into an interior of the base 3, connection sections 21 arranged in the interior of the base 3 and respectively connected to two opposite side edges of the rear cover 2, an adjustment mechanism 4 arranged in a front portion of the base 3, and two chains 20 arranged in the interior of the base 3 and each having two ends respectively connected to the connection sections 21 and the rotary knob mechanism 4.

As shown in FIG. 2, a central portion of a bottom of the display panel 1 is fixed by a first fixing section 12 to the base 3. A central portion of the rear cover 2 is fixed by a second fixing section 22 to the base 3.

The rear cover 2 has a height that is greater than a height of the display panel 1 and the rear cover 2 has a portion that exceeds the display panel 1 and extends into the interior of the base 3.

Figure 4:
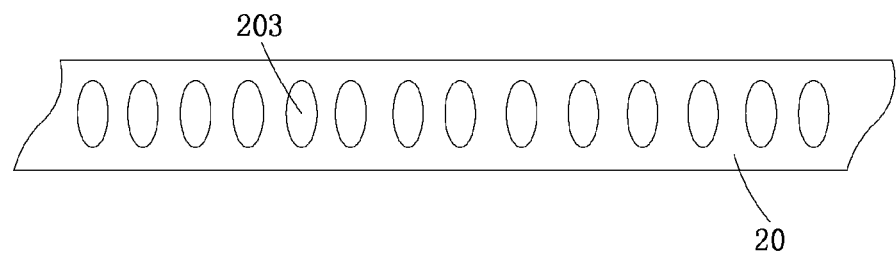
FIG. 4 is a schematic view showing a chain of the curvature adjustable display device according to the present invention.

As shown in FIG. 4, the chains 20 each comprises a plurality of holes 203 formed uniformly therein.

Figure 3:
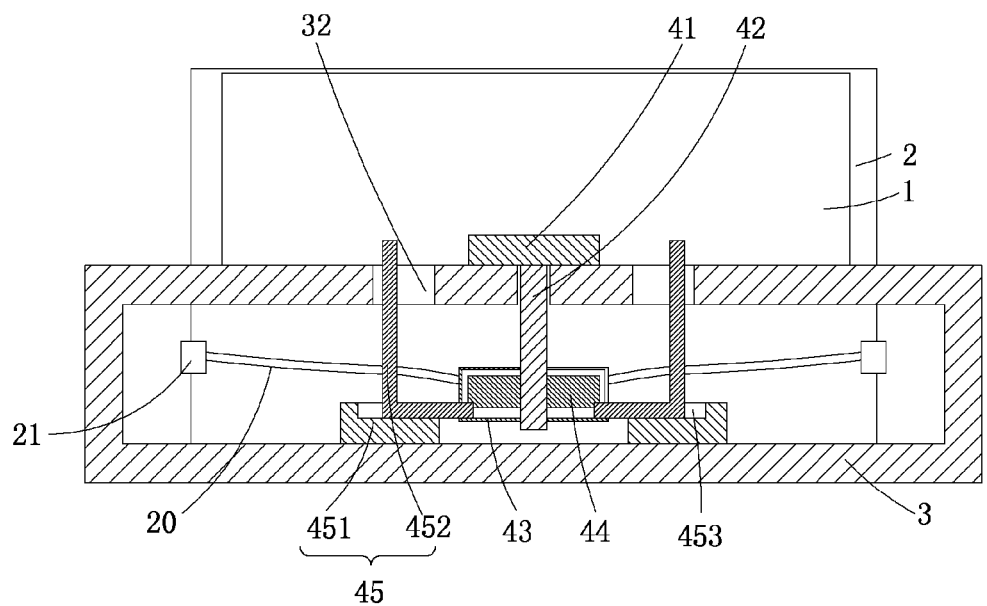
FIG. 3 is a cross-sectional view taken along line A-A of FIG. 2.
Figure 5:
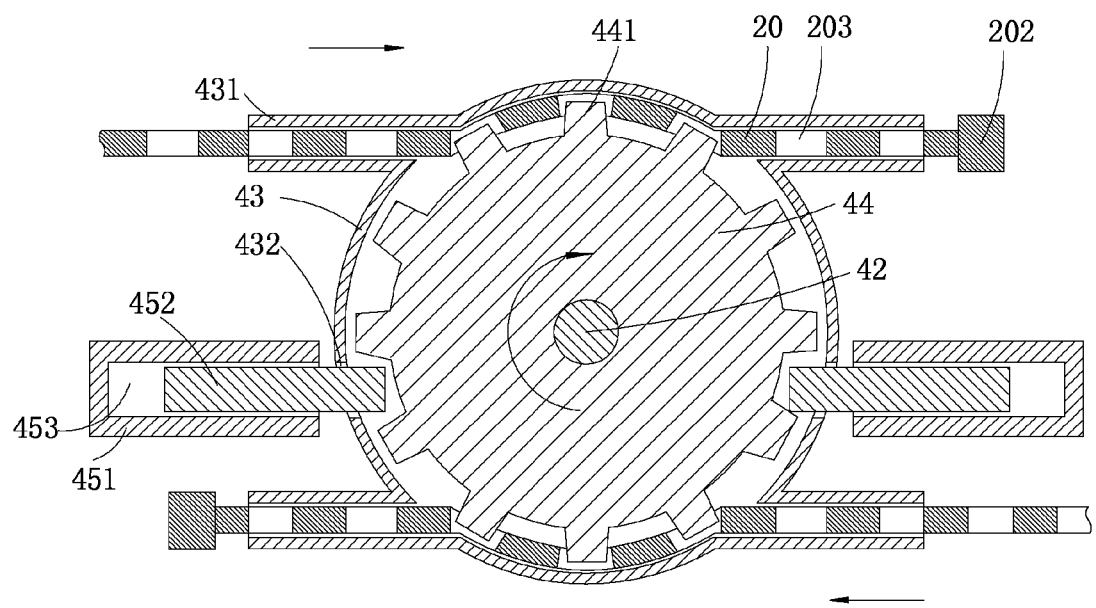
FIG. 5 is a schematic view showing mating engagement between the chain and an adjustment mechanism of the curvature adjustable display device according to the present invention.

Specifically, referring collectively to FIGS. 3 and 5, the adjustment mechanism 4 comprises a rotary knob 41 mounted on an external surface of the base 3, a toothed wheel enclosure 43 mounted in the interior of the base 3, a toothed wheel 44 arranged inside the toothed wheel enclosure 43, a rotation axle 42 coupling the rotary knob 41 and the toothed wheel 44, and locking sections 45 arranged on two sides of the toothed wheel enclosure 43. The toothed wheel enclosure 43 comprises a through hole formed in a center thereof and the rotation axle 42 extends through the through hole to respectively connect to centers of the rotary knob 41 and the toothed wheel 44.

The toothed wheel enclosure 43 is provided with four opening sections 431 that extend outwardly from an outer peripheral surface thereof in a mutually parallel manner and are in communication with an interior space of the toothed wheel enclosure 43. The outer peripheral surface of the toothed wheel enclosure 43 is provided with two through holes 432 that are opposite to each other.

The locking sections 45 each comprises a support section 451 fixed to the base 3 and a locking element 452 arranged on the support section 451. The support section 451 comprises a slide channel 453 formed in the middle thereof and the locking element 452 is slidable within the slide channel 453 and extends through the through hole 432 into the interior of the toothed wheel enclosure 43 to have the locking element 452 engaged inter-tooth gaps of the toothed wheel 44.

The chains 20 are respectively set at opposite sides of the toothed wheel enclosure 43 and are each received through the toothed wheel enclosure 43 by extending through two opposite ones of the opening sections 431. The toothed wheel 44 has a circumferential surface on which a plurality of uniformly distributed teeth 441 is formed in such a way that the spacing distance of the teeth 441 is identical to the spacing distance of the plurality of holes 203 of the chains 20. The plurality of teeth 441 of the toothed wheel 44 and the plurality of holes 203 of the two chains 20 mate each other in the interior of the toothed wheel enclosure 43. The chains 20 each has an end forming an end section 202. The end section 202 has a cross-sectional width that is greater than an inside diameter of the opening sections 431 to prevent the chain 20 from being withdrawn out of the toothed wheel enclosure 43.

As shown in FIG. 2, the base 3 has an upper surface in which a first deviation channel 31 and second deviation channels 32 respectively located on two sides of the rotary knob 41 are formed. The rear cover 2 is received through the first deviation channel 31 into the interior of the base 3. The first deviation channel 31 provides a positional deviation space for curving of the rear cover 2. The locking elements 452 respectively extend through the second deviation channels 32 to the outside of the base 3. The second deviation channels 32 provide positional deviation spaces for sliding of the locking elements 452 in the slide channels 453.

Before a curving operation is conducted for the display panel 1 of the curvature adjustable display device according to the present invention, initial positions of the locking elements 452 are respectively at locations on opposite sides and distant from the rotary knob 41. Through clockwise rotation of the rotary knob 41, the rotary knob 41 drives, via the rotation axle 42, the toothed wheel 44 to rotate and the toothed wheel 44 pulls and stretches the two chains 20 in mating engagement therewith from the two sides toward the center so that the chains 20 drive, via the connection sections 21, the two sides of the rear cover 2 to move frontwards with respect to the second fixing section 22, making the rear cover 2 curved, and at the same time, the rear cover 2 drives the two sides of the display panel 1 to move frontwards with respect to the first fixing section 12. When the display panel 1 reaches a curvature that is desired by a user, the locking elements 452 that are located on opposite sides of the rotary knob 41 are moved in directions toward the rotary knob 41 so that the two locking elements 452 respectively slide within the slide channels 453 of the support sections 451 and enter, through the through hole 432, into the interior of the toothed wheel enclosure 43 to engage the toothed wheel 44 to eventually be held and fixed in the inter-tooth gaps of the toothed wheel 44 to thereby fix the position of the toothed wheel 44 and achieve secure locking of the chains 20 and fix the adjustment-completed curvature the display panel 1 to prevent spring back of the curvature of the display panel 1 and complete the curvature adjustment of the display panel 1.

When the user attempts to restore the display panel 1 back to a planar condition, it is only necessary to move the locking elements 452 that are located on two opposite sides of the rotary knob 41 in directions to be away from the rotary knob 41 to have the two locking elements 452 disengage from the toothed wheel 44 and the rotary knob 41 is rotated counterclockwise to cause the toothed wheel 44 to rotate in a reversed direction and the two chains 20 in mating engagement with the toothed wheel 44 are released to allow the rear cover 2 and the display panel 1 to get back the initial position and restoring a planar condition.

In summary, the present invention provides a curvature adjustable display device, which comprises a rear cover arranged rearwards of a display panel and an adjustment mechanism mounted on a base with two chains that are connected to two sides of the rear cover being respectively in mating engagement with a toothed wheel of the adjustment mechanism, so that through rotation of the rotary knob of the adjustment mechanism to stretch the chains, the rear cover is driven to curve and the display panel is also caused to curve. Locking sections are included in the adjustment mechanism to selectively fix the curvature of the display panel that has been curved and to prevent the curvature of the display panel from springing back. The structure is simple and the operation is easy, allowing a user to adjust the display panel to a desired curvature according to the needs for viewing so as to improve the user's experience and enhance the attraction of products to the market.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A curvature adjustable display device, comprising a base, a display panel arranged on the base, a rear cover arranged rearwards of the display panel and having a bottom extending into an interior of the base, connection sections arranged in the interior of the base and respectively connected to two opposite side edges of the rear cover, an adjustment mechanism arranged in a front portion of the base, and two chains arranged in the interior of the base and each having two ends respectively connected to the connection sections and the adjustment mechanism;

rotation of the adjustment mechanism stretches the chains and drives, via the connection sections, the rear cover to curve and simultaneously, the rear cover drives the display panel to curve so as to achieve adjustment of curvature of the display panel.

2. The curvature adjustable display device as claimed in claim 1, wherein a central portion of a bottom of the display panel is fixed by a first fixing section to the base and a central portion of the rear cover is fixed by a second fixing section to the base; and rotation of the adjustment mechanism stretches the chains and drives, via the connection sections, two side edges of the rear cover to move frontwards with respect to the second fixing section and thus getting curved and simultaneously, the rear cover drives two side edges of the display panel to move frontwards with respect to the first fixing section and thus getting curved so as to achieve adjustment of curvature of the display panel.

3. The curvature adjustable display device as claimed in claim 1, wherein the rear cover has a height greater than a height of the display panel and has an excessive portion of the height extending into the interior of the base.

4. The curvature adjustable display device as claimed in claim 1, wherein the chains each comprises a plurality of holes uniformly formed therein.

5. The curvature adjustable display device as claimed in claim 1, wherein the adjustment mechanism comprises a rotary knob mounted on an external surface of the base, a toothed wheel enclosure mounted in the interior of the base, a toothed wheel arranged inside the toothed wheel enclosure, a rotation axle coupling the rotary knob and the toothed wheel, and locking sections arranged on two sides of the toothed wheel enclosure; and the toothed wheel is in mating engagement with the two chains and rotation of the rotary knob drives the toothed wheel to rotate so that the toothed wheel stretches the two chains to conduct adjustment of curvature of the display panel and the locking sections are operable to selectively fix the toothed wheel to prevent restoration of the curvature of the display panel.

6. The curvature adjustable display device as claimed in claim 5, wherein the toothed wheel has a circumferential surface on which a plurality of uniformly distributed teeth is formed in such a way that a spacing distance of the teeth is identical to a spacing distance of the plurality of holes of the chains.

7. The curvature adjustable display device as claimed in claim 6, wherein the toothed wheel enclosure comprises four opening sections that extend outwardly from an outer peripheral surface thereof in a mutually parallel manner and are in communication with an interior space of the toothed wheel enclosure; and the two chains are each received through the toothed wheel enclosure by extending through two opposite ones of the opening sections, the plurality of teeth of the toothed wheel and the plurality of holes of the two chains being engageable with each other in the interior of the toothed wheel enclosure.

8. The curvature adjustable display device as claimed in claim 5, wherein the locking sections each comprises a support section fixed to the base and a locking element arranged on the support section and the support section comprises a slide channel formed in a middle thereof and the locking element is slidable within the slide channel; and the toothed wheel enclosure has an outer peripheral surface in which two through holes that are opposite to each other are formed; and the locking elements are extendable through the through holes to enter the interior of the toothed wheel enclosure to engage inter-tooth gaps of the toothed wheel and thus fixing the toothed wheel.

9. The curvature adjustable display device as claimed in claim 7, wherein the chains each has an end forming an end section, the end section having a cross-sectional width that is greater than an inside diameter of the opening sections.

10. The curvature adjustable display device as claimed in claim 5, wherein the base has an upper surface in which a first deviation channel and a second deviation channel respectively located on two sides of the rotary knob are formed; the rear cover is received through the first deviation channel into the interior of the base and the locking elements respectively extend through the second deviation channels to the outside of the base.

11. A curvature adjustable display device, comprising a base, a display panel arranged on the base, a rear cover arranged rearwards of the display panel and having a bottom extending into an interior of the base, connection sections arranged in the interior of the base and respectively connected to two opposite side edges of the rear cover, an adjustment mechanism arranged in a front portion of the base, and two chains arranged in the interior of the base and each having two ends respectively connected to the connection sections and the adjustment mechanism;

rotation of the adjustment mechanism stretches the chains and drives, via the connection sections, the rear cover to curve and simultaneously, the rear cover drives the display panel to curve so as to achieve adjustment of curvature of the display panel;

wherein a central portion of a bottom of the display panel is fixed by a first fixing section to the base and a central portion of the rear cover is fixed by a second fixing section to the base; and rotation of the adjustment mechanism stretches the chains and drives, via the connection sections, two side edges of the rear cover to move frontwards with respect to the second fixing section and thus getting curved and simultaneously, the rear cover drives two side edges of the display panel to move frontwards with respect to the first fixing section and thus getting curved so as to achieve adjustment of curvature of the display panel;

wherein the rear cover has a height greater than a height of the display panel and has an excessive portion of the height extending into the interior of the base;

wherein the chains each comprises a plurality of holes uniformly formed therein;

wherein the adjustment mechanism comprises a rotary knob mounted on an external surface of the base, a toothed wheel enclosure mounted in the interior of the base, a toothed wheel arranged inside the toothed wheel enclosure, a rotation axle coupling the rotary knob and the toothed wheel, and locking sections arranged on two sides of the toothed wheel enclosure; and the toothed wheel is in mating engagement with the two chains and rotation of the rotary knob drives the toothed wheel to rotate so that the toothed wheel stretches the two chains to conduct adjustment of curvature of the display panel and the locking sections are operable to selectively fix the toothed wheel to prevent restoration of the curvature of the display panel.

12. The curvature adjustable display device as claimed in claim 11, wherein the toothed wheel has a circumferential surface on which a plurality of uniformly distributed teeth is formed in such a way that a spacing distance of the teeth is identical to a spacing distance of the plurality of holes of the chains.

13. The curvature adjustable display device as claimed in claim 12, wherein the toothed wheel enclosure comprises four opening sections that extend outwardly from an outer peripheral surface thereof in a mutually parallel manner and are in communication with an interior space of the toothed wheel enclosure; and the two chains are each received through the toothed wheel enclosure by extending through two opposite ones of the opening sections, the plurality of teeth of the toothed wheel and the plurality of holes of the two chains being engageable with each other in the interior of the toothed wheel enclosure.

14. The curvature adjustable display device as claimed in claim 11, wherein the locking sections each comprises a support section fixed to the base and a locking element arranged on the support section and the support section comprises a slide channel formed in a middle thereof and the locking element is slidable within the slide channel; and the toothed wheel enclosure has an outer peripheral surface in which two through holes that are opposite to each other are formed; and the locking elements are extendable through the through holes to enter the interior of the toothed wheel enclosure to engage inter-tooth gaps of the toothed wheel and thus fixing the toothed wheel.

15. The curvature adjustable display device as claimed in claim 13, wherein the chains each has an end forming an end section, the end section having a cross-sectional width that is greater than an inside diameter of the opening sections.

16. The curvature adjustable display device as claimed in claim 11, wherein the base has an upper surface in which a first deviation channel and a second deviation channel respectively located on two sides of the rotary knob are formed; the rear cover is received through the first deviation channel into the interior of the base and the locking elements respectively extend through the second deviation channels to the outside of the base.

* * * * *